United States Patent [19]
Thackston

[11] 3,955,662
[45] May 11, 1976

[54] TORQUE LIMITING WRENCH

[75] Inventor: Clyde David Thackston, Columbia, S.C.

[73] Assignee: Rockwell International Corporation, Pittsburgh, Pa.

[22] Filed: Dec. 19, 1974

[21] Appl. No.: 534,236

[52] U.S. Cl. ............................. 192/150; 64/30 E; 173/12
[51] Int. Cl.² ..................... F16D 43/20; F16D 7/02
[58] Field of Search ............... 64/30 E, 15 C, 27 C; 192/41 S, 56 C, 150; 173/12

[56] References Cited
UNITED STATES PATENTS

| | | | |
|---|---|---|---|
| 2,626,029 | 1/1953 | Gutterman | 192/56 C |
| 3,195,704 | 7/1965 | Linsker | 192/150 |
| 3,298,481 | 1/1967 | Schaedler et al. | 192/150 |
| 3,370,680 | 2/1968 | Bangerter et al. | 192/56 C |
| 3,537,275 | 11/1970 | Smith | 192/41 S X |

*Primary Examiner*—Allan D. Herrmann

[57] ABSTRACT

A power tool having an adjustable torque-limiting coupling and a shut-off means, the coupling (or clutch) consisting of a driving member, a co-axial driven member and a coupling assembly comprising a tapered helical spring and means for adjusting the position of the spring on the driving and driven members, and the shut-off means sensing relative movement between the driving and driven members, and effecting shut-off.

8 Claims, 3 Drawing Figures

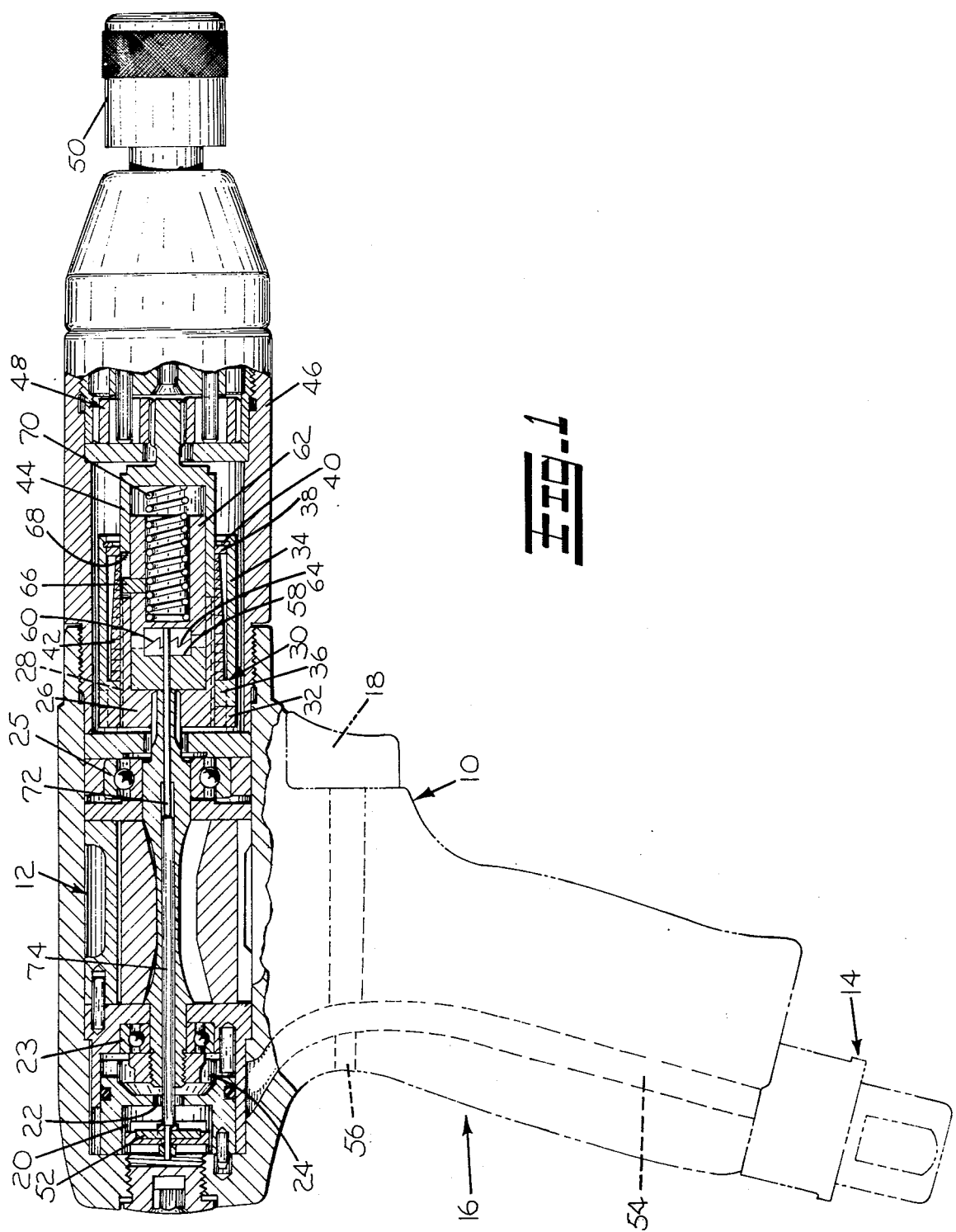

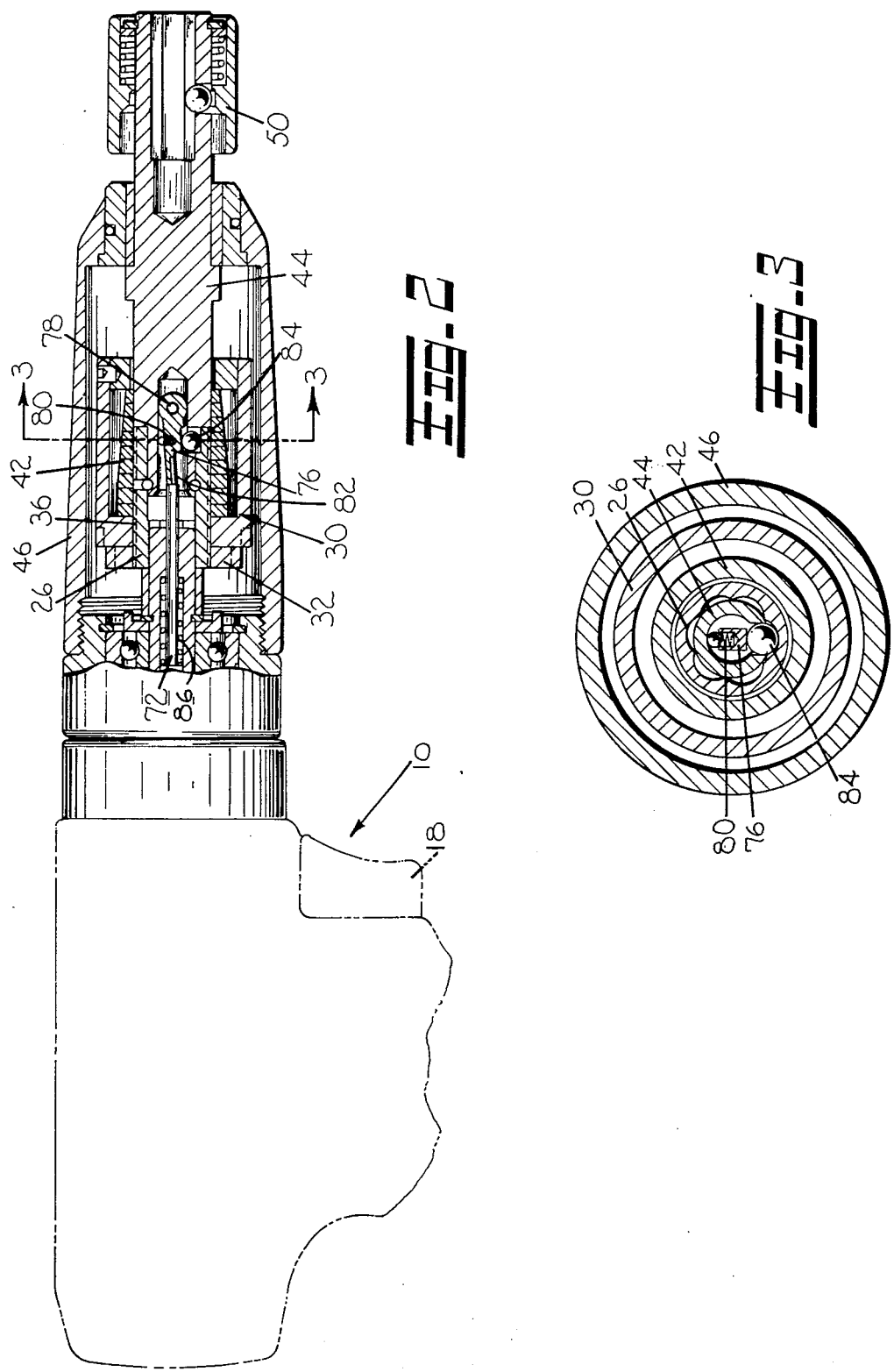

TORQUE LIMITING WRENCH

BACKGROUND OF THE INVENTION

This invention is a novel torque-limiting apparatus particularly adaptable to power wrenches. It is a torque-responsive coupling operable in response to a selected torque load to break the driving connection between an input (driving) member and an output (driven) member. This invention further incorporates shut-off means for de-energizing the power supply in response to a pre-determined torque load.

Previously, clutch mechanisms incorporated with shut-off controls undesirably transmitted inertia forces, and were unduly sensitive to the "hardness" of a joint. Also, the prior mechanisms were found to be sensitive to many variables in addition to the joint hardness, such as air pressure in pneumatic tools, differences in lubrication of the fasteners and of the tools, and motor inertia. For example, reference may be made to U.S. Pat. Nos. 3,370,680, 3,515,251, or 3,195,704, each of which is believed to disclose mechanisms characterized by one or more of the aforementioned problems. In addition, torque-limiting devices from other areas of the art, such as U.S. Pat. Nos. 3,782,515 and 1,126,780 are believed to lack certain desirable features provided by the instant invention.

It is a principal object of this invention to provide an improved adjustable torque-limiting coupling that is relatively insensitive to variations in many variables that normally affect output torque.

It is a further object to provide an improved torque-limiting coupling that is easily adjustable for a pre-set torque and offers greater repeatable accuracy.

It is a further object of this invention to provide a novel adjustable torque-limiting coupling that can be used with a variety of shut-off devices to interrupt the flow of power to the power source.

Another object of this invention is the provision of an adjustable torque-limiting apparatus that is relatively straight-forward in construction, easy to maintain and repair, and dependable in operation.

SUMMARY OF THE INVENTION

This invention pertains to an adjustable torque-limiting unit which, in a presently preferred embodiment, couples a driving shaft to a driven shaft by means of a spring of variable cross-section, so that the release force is a direct function of the cross-sectional area of the spring overlying the interface between driving and driven members. Adjustment is accomplished by moving the spring axially so that the cross-sectional area of the spring is varied at this place. The thickness of the coil (and thus the cross-sectional area) determines the torque transmitted to the output member.

BRIEF DESCRIPTION OF THE DRAWINGS

FIG. 1 is a side view, partly in section, of a pneumatic power wrench containing the torque-limiting unit coupled to one type of shut-off;

FIG. 2 is a view of the front end of a wrench partly in section, with an alternate type of shut-off; and FIG. 3 is a section through FIG. 2 on the line 3—3.

DESCRIPTION OF THE INVENTION

The adjustable torque-limiting coupling of this invention is shown here as it is incorporated in a pneumatic nut runner. It will readily be perceived, as the description progresses, that this clutch, or coupling, can also be used in electric nut runners, and in many other applications. Also in FIG. 1, the clutch is shown as installed between the pneumatic motor and the reduction gearing, while in FIG. 2 the coupling is installed after the gear train. This unit could even be made as an attachment for existing nut runners — as an external, "add-on," accessory. However, when built-in as shown here, the coupling can be incorporated with an automatic shut-off to cut the power supply (in this case, air) to limit wear on the clutch (coupling).

FIG. 1 shows a pneumatic nut runner 10, of the "pistol" type, having a conventional fluid motor 12 mounted therein as the driving means. Fluid is furnished via a hose (not shown) connected to an inlet 14 at the bottom of the handle 16. Passages (indicated schematically on FIG. 1) and a control valve (not shown) operated by trigger 18 admit fluid to chamber 20 at the rear of the tool. From this chamber 20, fluid flows through opening 22 and passages 24 to motor 12. All the above is conventional and well-known in the art. The motor shaft is supported upon bearings 23 and 25, and is of conventional construction, with the input drive spindle 26 splined to the motor shaft. Spindle 26 is externally threaded at 28 with left-hand threads to accept torque adjusting nut 30 and lock nut 32. Torque adjusting nut 30 has an elongated body 34 with a threaded portion 36 at one end and a spacer 38 and retaining ring 40 seated in the other end, and encloses coil spring 42. Spring 42 (right-hand wound) fits tightly on input drive spindle 26 and also fits tightly around output drive spindle 44. This coil spring has a constant inside diameter in the relaxed condition and this diameter is very slightly smaller than the outer diameter of input drive spindle 26 and output drive spindle 44. Spring 42 has the outer diameter of its coils machined in a taper, with the small end on the output spindle. Torque adjusting nut 30 is threaded on input spingle 26 and, by adjusting the position of nut 30 on spindle 26, positions spring 42 axially along the input spindle. This determines the particular coil of spring 42 that links input spindle 26 to output spindle 44, which in turn apparently determines the amount of torque transmitted. Any force above the amount of torque selected merely causes the coils on output spindle 44 to slip over the outer surface of spindle 44. Torque adjusting nut 30 is retained in the desired position by lock nut 32. In the embodiments shown here, the torque adjustment is accessible by unscrewing the forward position 46 of the tool from the body of the tool, then reaching into the torque adjusting nut 30 and the lock nut 32 with a tool properly adapted to fit the nuts, such as a spanner.

In the embodiment shown in FIG. 1, the rotating motion is transmitted from output spindle 44 to planetary gearing 48 which is only partially shown here as it is too well-known in the art to need description. From the gearing 48, the torque is transmitted to nosepiece 50, which can be any suitable tool holder for the purpose.

In the embodiment shown in FIG. 2, the clutch or coupling is placed after the gearing, adjacent the nosepiece 50, which is shown as an integral part of output spindle 44.

The clutch described above is the presently preferred embodiment. It will be obvious to those skilled in the art, however, that the coupling admits of a number of alternate configurations, such as reversing the spring 42 to place the small end on the input drive spindle 26, or placing spring 42 inside input drive spindle 26 and output drive spindle 44, bearing against the inside of these hollow drive spindles.

In order to minimize wear on the clutch parts, it has been combined with a shut-off mechanism in these figures. Both shut-off mechanisms sense relative rotation between the input drive spindle 26 and the output drive spindle 44 and move a valve 52 in chamber 20 to close opening 22. In both embodiments, valve 52 (only shown in FIG. 1) is held closed by the incoming fluid pressure until the operator releases trigger 18, at which time the inlet fluid flow 54 is interrupted and chamber 20 is vented to atmosphere through vent 56, all in a manner well-known in the art.

In the embodiment of FIG. 1, an end face 58 of input drive spindle 26 has fixed to it (or integral therewith) an annulus of cam teeth 60 arranged concentrically about the longitudinal axis of the tool. Attached to open-ended cylinder 62, and meshing with teeth 60, is a like cam with teeth 64. Cylinder 62 is slidable in output spindle 44, but is linked by pin 66 to spindle 44 to rotate therewith. Pin 66 is longitudinally slidable in slot 68. Slot 68 is as wide as the distance of one tooth to another of cam 64, which permits pin 66, cylinder 62 and teeth of cam 64 to always engage, regardless of the position that output spindle 44 stops with respect to input spindle 26. The assembly of cylinder 62, pin 66 and cam 64 is biased by spring 70 toward engagement with cam 60, which is longitudinally fixed. Attached to the closed end of cylinder 62 and running through the hollow shaft of fluid motor 12 is a push rod 72 which engages stem 74 of valve 52. During normal operation, teeth 60 and 64 are engaged under the bias of spring 70. When the set torque is reached, input spindle 26 moves rotatably relative to output spindle 44, and teeth 64 ride up on teeth 60 against the bias of spring 70. This moves cylinder 62 and push rod 72 to the right as seen in FIG. 1, allowing valve 52 to close under the impetus of the pressure differential. This pressure differential keeps valve 52 closed until the operator releases trigger 18, which vents chamber 20 to atmosphere through passage 56. When the pressure on valve 52 is thus equalized, spring 70 acts to push cylinder 62 and push rod 72 back to the left as seen in FIG. 1. Teeth 60 and 64 of the cams go back into mesh, restoring valve 52 to the position shown in FIG. 1, and readying the tool for use again.

In the embodiment of FIGS. 2 and 3, the operation of the tool and clutch are the same, and like parts have been given like numbers. The porting, shut-off valve, and fluid motor are the same and are not shown in FIG. 2. The means of retaining push rod 72 differs in this embodiment from that shown in FIG. 1, and resembles U.S. Pat. No. 3,195,704 in some respects. In this embodiment, axial movement is confined to push rod 72 and valve 52. A release member 76 is pivotally mounted on the driven member 44 by means of a suitable pin 78. This release member 76 is normally urged to a cocked, or set, position by a small transverse spring 80. The release member is notched as at 82 to allow movement of the push rod, but in its cocked position the release member is held such that the notch is not aligned with the rod, and an end of the release member will engage the end of the rod, as shown in FIG. 2. When the tool is not being operated, push rod 72 is biased to the left as seen in FIG. 2 by spring 84. This moves push rod 72 to the left, allowing release member 76 to assume the position shown in FIG. 2 under the influence of spring 80.

During the operation of the tool, the above-described position of the release member 76 and push rod 72 keeps the valve 52 open, allowing the motor to operate causing nosepiece 50 to drive the nut (or other fastening operation) until the torque being transmitted by the coupling assembly exceeds the pre-set value. As soon as the torque exceeds this pre-set value, relative movement takes place between input spindle 26 and output spindle 44. As can best be seen in FIG. 3, as soon as input spindle 26 rotates relative to output spindle 44, ball 84 is cammed inwardly, moving release member 76 pivotally about pin 78, allowing push rod 72 to move to the right as seen in FIG. 2, down the notch 82. This closes the valve member under the pressure differential of the inlet fluid, and keeps the valve closed until the trigger 18 is released, venting chamber 20 and balancing the pressure across valve 52. At this point, the spring 86 returns valve 52 and push rod 72 to the cocked position, and spring 80 returns release member 76 to the position shown in FIG. 2, thus resetting the shut-off assembly for the next operation.

While the forms of apparatus herein described constitute preferred embodiments, it is to be understood that the invention is not limited to these precise forms of apparatus, and that changes may be made therein without departing from the scope of the invention which is defined in the appended claims.

What is claimed is:

1. A power tool having a motor, an output shaft for transmitting rotation to a tool bit; and a torque-limiting assembly comprising adjustable torque transmitting means with a driving member, a co-axial driven member, a helical spring frictionally connecting said driving member and said driven member, the wire size of the spring varying from end-to-end, means for adjusting the position of said spring axially, and automatic shut-off means for interrupting the supply of power to said motor.

2. A manually operable power tool having a motor, means for manual control of power to said motor, automatic shut-off means for interrupting the supply of power to said motor, a torque-limiting assembly for transmitting torque to the output shaft of said tool, said torque-limiting assembly comprising a driving spindle connected to the output of said motor, a driven spindle co-axial with and abutting said driving spindle, said driven spindle connected to said output shaft, and a helical spring frictionally connecting said driving member and said driven member, said torque-limiting assembly having means for operating said automatic shut-off means.

3. The power tool of claim 2, in which said helical spring cross-sectional area uniformly increases in size from one end towards the other.

4. The power tool of claim 3 in which means is provided for adjusting axially the position of said helical spring connecting said driving member and said driven member.

5. The power tool of claim 4 wherein said means for adjusting the position of said helical spring comprises a threaded adjusting nut.

6. A manually operable power tool comprising a motor, operator control means for control of power to said motor, automatic shut-off means for interrupting the supply of power to said motor, said shut-off means remaining operable after initial automatic actuation until interruption of power by said operator control means, after which said automatic shut-off means resets for the next cycle of operation, an adjustable torque-limiting assembly for transmitting torque to the output shaft of said tool, said torque-limiting assembly comprising a driving spindle, connected to the output of said motor, a driven spindle co-axial with and abutting said driving spindle, said driven spindle being connected to said output shaft, a helical spring frictionally coupling said driving spindle and said driven spindle and being axially adjustable along said driving and driven spindles, said helical spring cross-sectional area increasing from the end over the output spindle towards the other end of said spring; and means connecting said torque-limiting assembly and said automatic shut-off means, whereby said torque-limiting assembly actuates said automatic shut-off means upon attaining the pre-set limit of torque.

7. The power tool of claim 6 wherein said helical spring is axially adjusted by a torque adjusting nut enclosing said helical spring.

8. The power tool of claim 6 wherein said helical spring is wound so that increasing resistance to rotation tends to loosen said spring coils on said driven spindle.

* * * * *